United States Patent [11] 3,585,539

[72] Inventor Tadikonda N. Rao
Plainfield, N.J.

[21] Appl. No. 811,836
[22] Filed Apr. 1, 1969
[45] Patented June 15, 1971
[73] Assignee Bell Telephone Laboratories, Incorporated
Murray Hill, N.J.

[54] HIGH FREQUENCY GYRATOR CIRCUITS
16 Claims, 13 Drawing Figs.

[52] U.S. Cl. .................... 333/80T, 333/70 R
[51] Int. Cl. .................... H01p 1/32, H03h 11/00
[50] Field of Search .................... 333/80, 80 T

[56] References Cited

UNITED STATES PATENTS

| | | | |
|---|---|---|---|
| 3,001,157 | 9/1961 | Sipress et al. | 333/80 |
| 3,042,759 | 7/1962 | Bonner | 333/80 T (UX) |
| 3,109,147 | 9/1963 | Witt | 333/80 (UX) |
| 3,120,645 | 2/1964 | Sipress et al. | 333/80 T (UX) |
| 3,400,335 | 9/1968 | Orchard et al. | 333/80 T (UX) |
| 3,448,411 | 6/1969 | Patterson | 333/80 T (UX) |
| 3,493,901 | 2/1970 | Deboo | 333/80 |
| 3,500,262 | 3/1970 | Daniels | 333/80 T (UX) |
| 3,501,716 | 3/1970 | Ferch et al. | 333/24 X |
| 3,497,836 | 2/1970 | Daniels | 333/80 T (UX) |

*Primary Examiner*—Herman Karl Saalbach
*Assistant Examiner*—Wm. H. Punter
*Attorneys*—R. J. Guenther and Edwin B. Cave

ABSTRACT: A gyrator circuit effective at frequencies up to several tens of megacycles is formed by the parallel connection of two differential voltage-current converters each utilizing a respective pair of transistors. Simplicity is enhanced and stability at high frequencies is ensured by directly cross-connecting each of the two output transistors to an opposite one of the input transistors. The conventional need for additional transistors to effect inversion is avoided. The circuit may be connected as a replacement for a floating inductor or, alternatively, for a grounded inductor.

INVENTOR
T. N. RAO
BY
ATTORNEY

HIGH FREQUENCY GYRATOR CIRCUITS

BACKGROUND OF THE INVENTION

1. Field of the Invention

This invention relates to gyrator circuits and more specifically, to gyrators suitable as replacements for inductors in high quality, high frequency filters.

2. Description of the Prior Art

A problem which prevents full exploitation of the potential utility of integrated circuits involves the continuing necessity for discrete inductive circuit elements. As yet, no satisfactory means has been devised for fabricating an inductive element by monolithic, thin film or compatible techniques. Obviously, discrete inductive elements can be added to hybrid circuits but the physical size of such elements is generally inconsistent with the miniaturization that the circuit designer seeks to achieve.

One solution to the problem indicated involves the use of gyrator circuits in lieu of inductors, the gyrator circuits being formed from a combination of active and passive elements which, together, create an inductive effect. Such gyrator circuits are typically identified in terms of the admittance matrix of the two-port network formed from the particular circuit combination indicated. An ideal gyrator admittance matrix is conventionally identified by the following matrix expression:

$$Y=\begin{bmatrix}0 & -g_m\\ +g_m & 0\end{bmatrix} \quad (1)$$

Gyrators have long been recognized as essential circuit building blocks if maximum flexibility in the synthesis of passive networks is to be achieved since by resistance, inductance, capacitance and ideal transformers alone, all passive networks cannot be realized. The gyrator is uniquely distinguished from the four more conventional passive elements by its nonreciprocity and it may in fact be accurately characterized as an antireciprocal two-port network.

A variety of circuit combinations have been proposed heretofore toward the end of achieving a gyrator with good stability over a wide range of frequencies which would permit its use as a replacement for inductance elements in precision filter circuits for example. Illustrative of such gyrators are those disclosed by D. F. Sheahan and H. J. Orchard in Electronic Letters, 1966, Vol. 2, No. 7, pgs. 274—275, and by J. M. Sipress and F.J. Witt in U.S. Pat. No. 3,001,157, issued Sept. 19, 1961. Significant deficiencies in prior art gyrators, particularly where filter applications are desired, include low to medium values of Q, narrowly restricted bandwidth capabilities (e.g. below 100 kHz.), biasing which depends on an exceedingly close match between transistors of different conductivity type, limited compatibility with integrated circuit techniques, and an undesirably large number of transistors in the signal path which results in excessive phase shift and hence instability at high frequencies.

A general object of the invention is to overcome the deficiencies indicated.

SUMMARY OF THE INVENTION

In accordance with the invention, a gyrator circuit effective at frequencies up to several tens of megacycles is formed by the direct parallel connection of two differential voltage-current ($v$–$i$) converters. Each of the converters ideally comprises a respective emitter-coupled transistor pair. An important aspect of the invention involves the elimination of heretofore conventional additional output transistors employed solely to achieve current or voltage sign reversal or inversion. In accordance with the invention, each of the two transistors in the output converter is cross-connected directly to an opposite one of the transistors in the input converter. The phase shift and consequent frequency instability introduced heretofore by inversion transistors is thus avoided.

In accordance with one feature of the invention, the circuit may readily be connected to simulate either a floating or a grounded inductor In accordance with another feature of the invention, even though the signal handling transistors in a gyrator circuit are high quality transistors of mixed conductivity type and mixed conductivity type transistors are employed for biasing, the close matching of characteristics is required only among the transistors of a common conductivity type. Fabrication by integrated circuit techniques is thus made more attractive.

DETAILED DESCRIPTION

A brief consideration of some of the theoretical aspects of gyrator circuit design, particularly from the standpoint of frequency behavior, will serve as a useful preface to an analysis of the circuits employed in specific illustrative embodiments of the invention.

It is well known that the practical problem of circuit realization for one type of gyrator may be reduced to the realization of a voltage controlled current source. A common voltage-to-current ($v$–$i$) converting device that approaches the ideal gyrator-type current source is simply a transistor connected in common emitter configuration with a high resistance in the emitter lead. It is also known that the quality of a gyrator is directly related to how nearly a practical $v$–$i$ converter may be made to conform to an ideal $v$–$i$ converter. Important criteria for this quality include frequency stability and bandwidth.

Figure 1A:
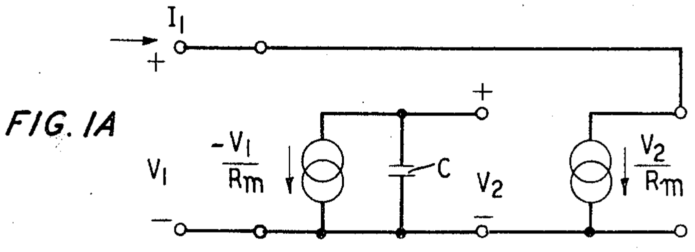
FIG. 1A is a schematic circuit diagram of an ideal capacitor loaded gyrator.
Figure 1B:
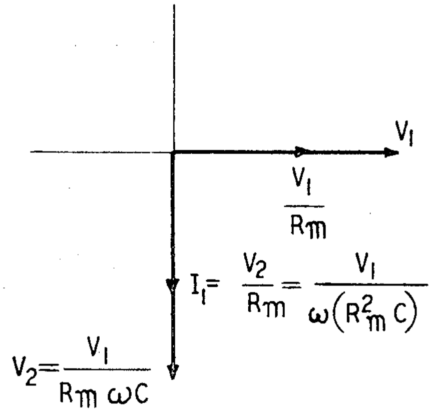
FIG. 1B is a phasor diagram for the voltages and currents shown in FIG. 1A illustrating an absence of phase shifts in the converters.

To understand the high frequency behavior of gyrator circuits, where phase shifts in the $v$–$i$ converters are the most important effects, it is helpful to analyze an ideal capacitor loaded gyrator of the type shown in FIG. 1A. An examination of FIG. 1B, the phasor diagram for the circuit of FIG. 1A, shows the phase relations between the various voltages and currents involved and provides considerable insight into the problem. It is evident, for example, that the current $I_1$ lags the voltage $V_1$ by exactly 90°, and the $V_1$–$I_1$ relationship is exactly like that of an ideal inductor. If it is assumed that the current in each $v$–$i$ converter lags behind the voltage by a small angle $\epsilon$, the phasor diagram of FIG. 1B translates into the diagram shown in FIG. 1C.

Figure 1C:
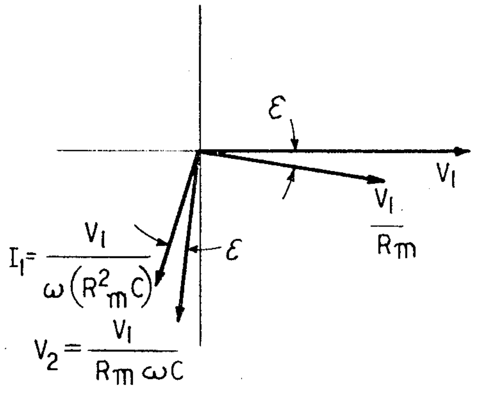
FIG. 1C is a phasor diagram for the voltages and currents shown in FIG. 1A illustrating a phase lag of $\epsilon$ in each of the converters.
Figure 2A:
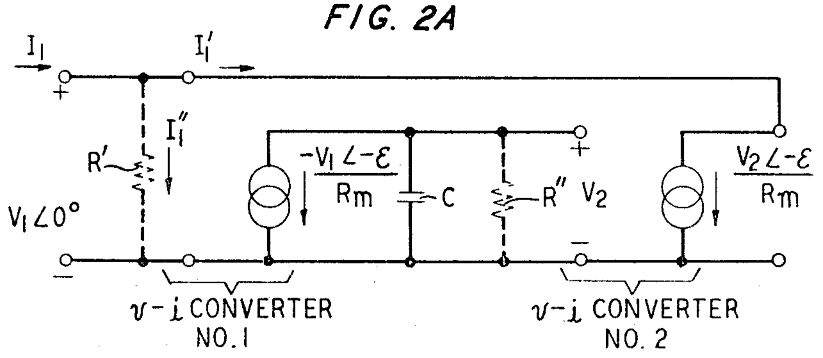
FIG. 2A is a schematic circuit diagram of a gyrator with finite input and resistances for the converters.
Figure 2B:
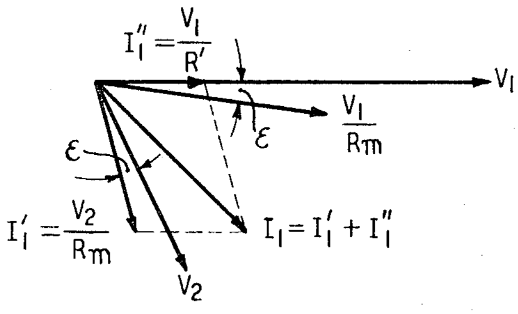
FIG. 2B is a phasor diagram for the voltages and currents shown in FIG. 2A.

In the diagram of FIG. 1C, the current $I_1$ lags $V_1$ by $90+2\epsilon$, where $\epsilon>0$ and the circuit is obviously unstable. This elementary argument shows that an arbitrarily small lag of $i$ in a $v$–$i$ converter causes instability in the ideal case under consideration. In the circuit model shown in FIG. 1A the finite input and output impedances of each of the $v$–$i$ converters have been omitted. These are essentially resistive at low frequencies When, as shown in the circuit of FIG. 2A, a capacitor C is shunted by a resistor R'' which is equivalent to a parallel combination of the output and input resistances of the first and second $v$–$i$ converters, respectively $V_2$ as shown in FIG. 1C will no longer be perpendicular to $V_1/R_m$ but will be as shown in FIG. 2B. It should be noted that the angle $\epsilon$ and deviation of $V_2$ from the perpendicular to $V_1/R_m$ are exaggerated relative to the angles in a practical circuit. In addition, as shown in FIG. 2B, $I_1$ has two components $I'_1$ and $I''_1$, the first resulting from the second $v$–$i$ converter and the second resulting from the parallel combination of the input and output resistances of the first and second $v$–$i$ converters respectively. The resulting $I_1$ can be in the fourth quadrant because of the finite positive output and input resistances of the $v$–$i$ converters. It is thus evident that finite output and input resistances for the $v$–$i$ converters are essential for the stability of a gyrator of the type shown if there are nonzero phase shifts in the converters.

The phasor diagrams considered are essentially single frequency analyses of the circuit. Although such analyses do not provide a clear idea as to the stability of the circuit over the entire range of frequencies, they do serve to emphasize certain important concepts. For example, if the Q of the simulated inductor is lower than that needed for a particular circuit at a particular frequency, it can be seen that an increase in the value of $\epsilon$ would swing the vector $I_1$ clockwise and bring it closer to 90°, thus increasing the Q of the simulated inductor. For several circuits this increase in $\epsilon$ can be readily accomplished by increasing the phase shift of the $v$–$i$ converters, and, up to a certain degree, Q enhancement is possible without undue sacrifice in the sensitivity of the circuit. Similarly, it is known that at a particular frequency, $\epsilon$ may be decreased to enchance stability. Despite the various principles illustrated by FIGS. 1B and 1C, behavior of the circuit with varying frequency is still difficult if not impossible to understand with the aid of phasor diagrams alone, and accordingly, more comprehensive analyses are required.

In this connection, Nyquist plots and root locus techniques have been employed heretofore, but they appear to be of limited use in designing a high frequency gyrator. In accordance with the invention, it has been found that in a capacitively loaded gyrator, stability and high frequency performance are most readily determined through the observation of the driving point admittance.

Figure 3A:
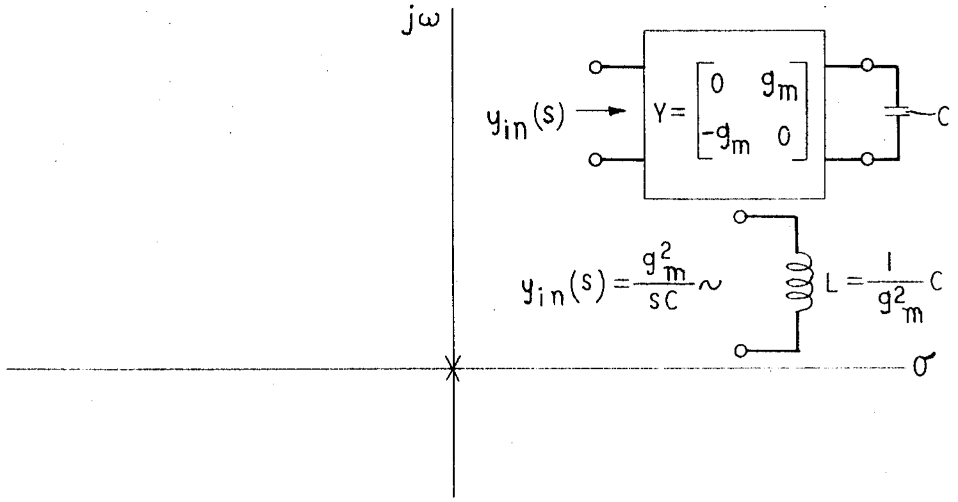
FIG. 3A is a schematic circuit diagram of an ideal capacitor-terminated gyrator and a pole-zero plot of the input admittance.

In undertaking the analysis of the driving point admittance of a gyrator, it is helpful to consider the ideal gyrator whose admittance matrix is defined by Equation ($b$). When such a gyrator is terminated in a capacitor C at port 2, the admittance $y_{in}$ looking into port 1 is $$y_{\text{in}}=\frac{g_m^2}{sC} \tag{2}$$

and thus the input looks like a pure inductor of value $L=(C/g^2)$. In the finite complex frequency plane, this value merely appears as a pole (X) at the origin as shown in the plot of FIG. 3A.

Consider next a more realistic version of the Y matrix which is quite an accurate representation for gyrators simulating practical phase inductors at low frequencies. For such a case the gyrator may be represented by the admittance matrix $$Y=\begin{bmatrix} \frac{1}{R} & g_m \\ -g_m & \frac{1}{R} \end{bmatrix} \tag{3}$$

which may be expressed as $$y_{\text{in}}(s)=\frac{1}{R}+\frac{g_m^2}{\frac{1}{R}+sC} \tag{4}$$

which is equivalent to $$\frac{(sRC+1)+g_m^2R^2}{R(sRC+1)} \tag{5}$$

Typically, $g_m$ has a magnitude on the order of $10^{13}$ and the magnitude of $R$ is on the order of $10^6$, and therefore $$y_{\text{in}}(s)\approx\frac{\left(s+\frac{g_m^2R}{C}\right)}{R\left(s+\frac{1}{RC}\right)} \tag{6}$$

which is an RL driving point admittance. This model shows no instability.

Figure 3B:
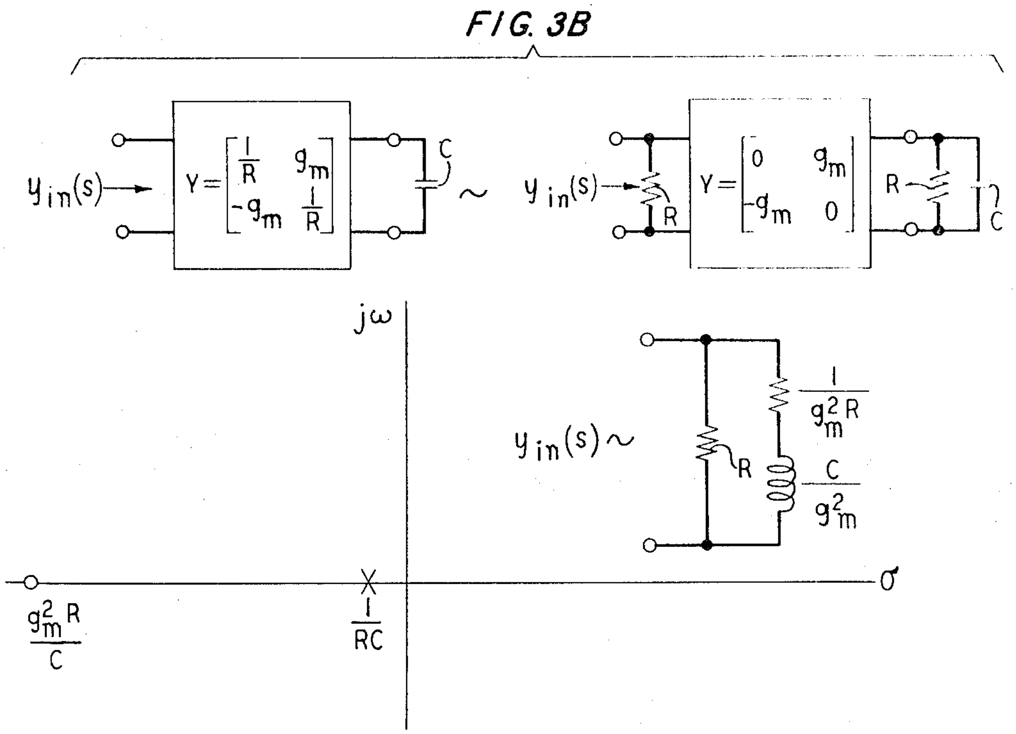
FIG. 3B is a schematic circuit diagram of a practical gyrator loaded with a capacitor at low frequencies and a pole-zero plot of the input admittance.

At this point we may consider the input and output impedances of the $v$–$i$ converters of a gyrator as pure resistors shunted by small capacitors. This is equivalent to increasing the value of the capacitor C slightly at port 2 and adding a shunt capacitor across port 1. Thus it can readily be understood, as illustrated by FIG. 3B, that the modification suggested causes no instability, since the driving point function corresponds to a passive RLC circuit.

To consider the problem of frequency dependent phase shift in the $v$–$i$ converters, we assume that the $g_m$ are functions of $s$ and represent them by $g_m/(s+\omega_a)$ and $g_m/(s+\omega_b)$. We assume one pole approximations for simplicity, and in most circuits $\omega_a\neq\omega_b$ inasmuch as the two $v-i$ converters are slightly different from each other owing to the difference in the signs of the current sources in the two $v$–$i$ converters (FIGS. 1A and 2A). Under these assumptions, the admittance matrix of the gyrator may be expressed as $$Y=\begin{bmatrix} \frac{1}{R} & \frac{g_m}{s+\omega_a} \\ -\frac{g_m}{s+\omega_b} & \frac{1}{R} \end{bmatrix}. \tag{7}$$

When loaded with a capacitor C at port 2 the input admittance $y_{in}(s)$ seen at port 1 is $$y_{\text{in}}(s)=\frac{1}{R}+\frac{g_m^2/C}{(s+\omega_a)(s+\omega_b)\left(s+\frac{1}{RC}\right)} \tag{8}$$

or $$=\frac{1}{R}+y_{\text{in}}'(s) \tag{9}$$

$$y_{\text{in}}'(s)=\frac{g_m^2/C}{(s+\omega_a)(s+\omega_b)\left(s+\frac{1}{RC}\right)} \tag{10}$$

Figure 3C:
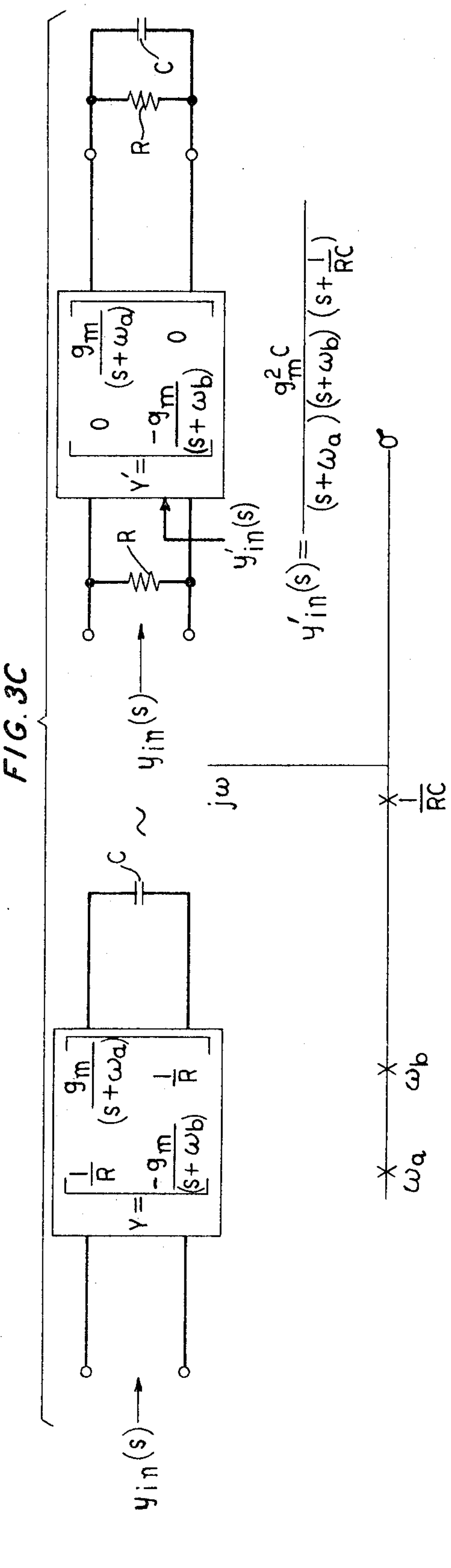
FIG. 3C is a schematic circuit diagram of a gyrator with assumed one-pole response converters and a pole-zero plot of the input admittance thereof.

The pole-zero plot of $y'_{in}(s)$ shown in FIG. 3C indicates that $y'_{in}()$ is not positive real and the addition of the admittance $1/R$ may or may not make it stable, depending on the value of $R$. It is evident that the greatest attention should be given to $y'_{in}()$ inasmuch as the presence of the $1/R$ term in $y_{in}(s)$ can only help it towards stability. Here again, the input and output admittance of the $v$–$i$ converters can be considered as pure resistors shunted by capacitors which, in fact, is a close approximation of the impedances encountered even with high frequencies. It is evident, moreover, that the presence of these impedances is in no way detrimental to the stability of the circuit.

Figure 4:
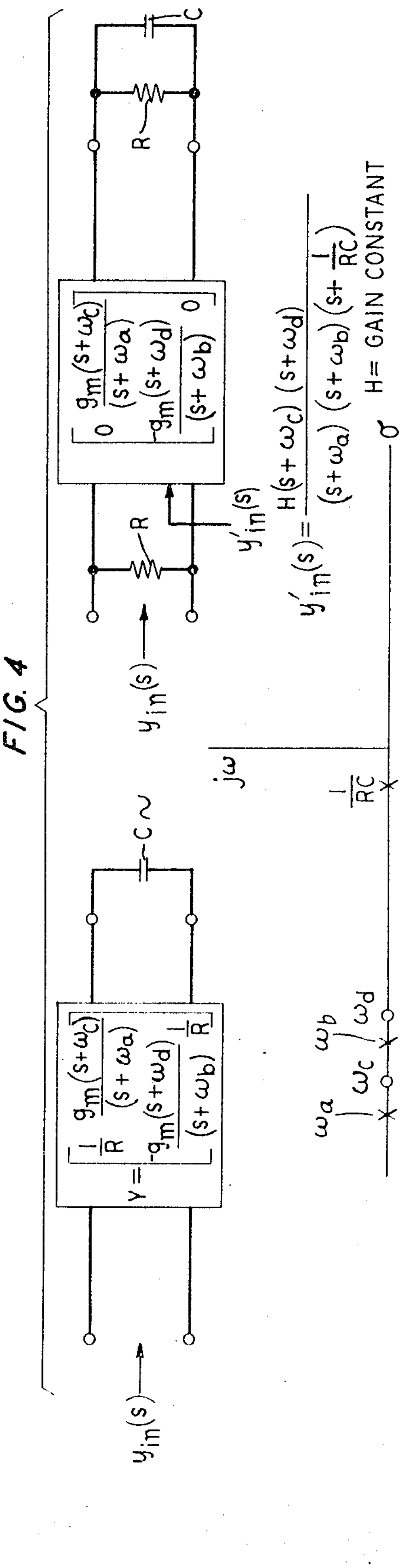
FIG. 4 is the diagram and plot shown in FIG. 3C modified, however, by the addition of two zeros so that the resulting driving point admittance corresponds to a passive RL network which is always stable.

From the foregoing considerations, it appears that if $y'_{in}(s)$ can be established as the driving point admittance of an RLC network, stability will be guaranteed. In the case illustrated by FIG. 3C, the driving point admittance of a passive network is not achieved but it can be attained by introducing two zeros, one between the poles of $\omega_a$ and $\omega_b$ and another between the poles $\omega_b$ and $1/RC$. These zeros can conceivably be introduced in the $v$–$i$ converters without introducing any poles that are dominant at the desired frequency of operation. A suitable Y matrix and the resulting pole-zero pattern are shown in FIG. 4. It can be seen that the resulting $y'_{in}(s)$ is an RL function and stability is guaranteed.

Figure 5:
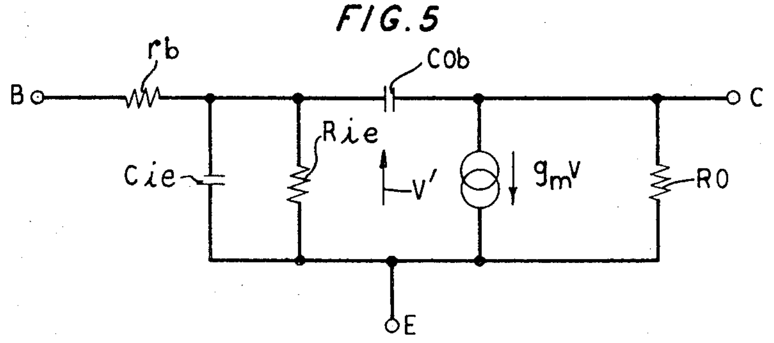
FIG. 5 is a schematic circuit diagram of a small signal circuit model for a high frequency transistor.

The single pole approximations of the $v$–$i$ converters (i.e., the $y_{12}$ and $y_{21}$ terms) are rather gross approximations in terms of practical circuits, since any adequate circuit model for a transistor needs at least two capacitors, and usually no less than two transistors are required in a workable $v$–$i$ converter. When a small signal circuit model for a high frequency transistor of the form shown in FIG. 5 is employed, the exact computations for the poles and zeros of the driving point admittance of a capacitor loaded gyrator of the simplest form become extremely complex and can be accomplished only with the aid of a computer. However, no computer program for the synthesis of a stable gyrator circuit is known, and accordingly, the procedure consists of examining the pole-zero plot of the driving point admittance of a chosen capacitor loaded gyrator circuit and modifying the circuit to obtain a suitable pole-zero pattern.

Figure 6:
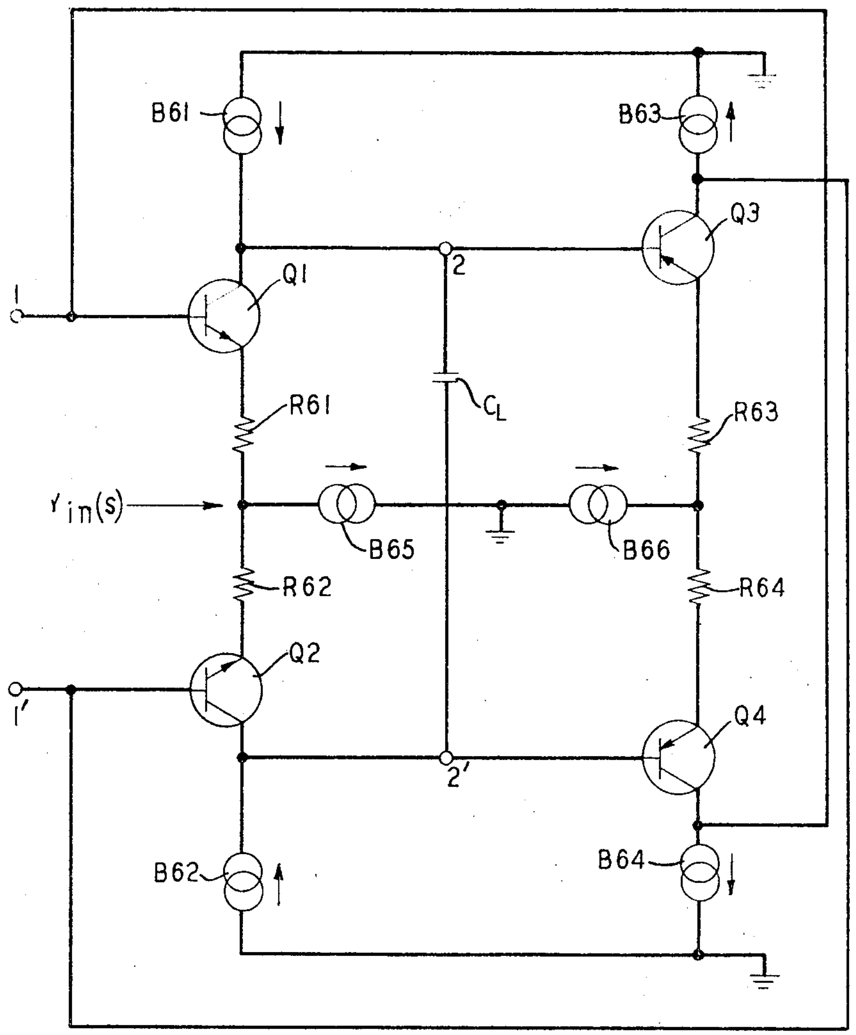
FIG. 6 is a detailed circuit diagram of a gyrator in accordance with the invention with the biasing means shown schematically.

The procedure outlined above has been employed, in accordance with the invention, in the design of the gyrator circuit illustrated in FIG. 6. As shown, the circuit employs a first transistor pair, transistors Q1 and Q2, and a second transistor pair, transistors Q3 and Q4, connected in parallel as first and second differential voltage-current converters. Emitter resistors R61 and R62 connect the emitters of the input differential pair, and the emitter resistors R63 and R64 connect the emitters of the output differential pair. The first port 1–1′ is defined by the base electrodes of the input transistors, Q1 and Q2, and the second port 2–2′, bridged by a capacitor $C_L$, is defined by the collector terminals of those transistors, or by the base terminals of transistors Q3 and Q4. For simplicity, the biasing circuit is not shown in detail and is indicated instead schematically by the biasing current sources B61 through B66.

In contrast with prior art arrangements, the circuit shown in FIG. 6 requires no additional transistors or other circuit devices or elements to effect the characteristic gyrator sign change or inversion. Instead, in accordance with the invention, each of the transistors Q3 and Q4 has its collector directly connected to the base electrode of an opposite one of the input transistors. A key factor involved in the limited high frequency stability found in prior art gyrators is the excessive phase shift which is introduced by the extra transistors typically employed to effect inversion. With the elimination of such transistors in accordance with the invention, the indicated phase shifts are no longer experienced and high frequency performance is markedly improved.

Figure 7:
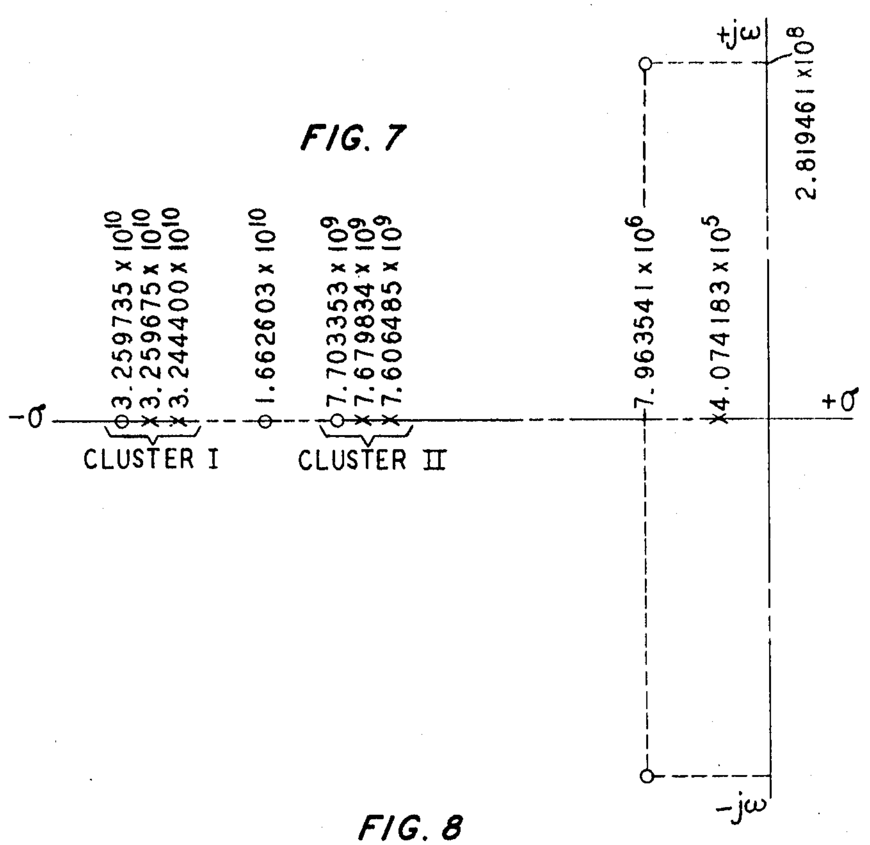
FIG. 7 is a pole-zero plot of the transfer characteristics of the circuit of FIG. 6.

As shown, the circuit of FIG. 6 may perform as a floating inductor, but the simple grounding of one of the first port terminals 1–1′ makes the circuit available as a grounded inductor. Another aspect of the circuit of Fig. 6 that is of particular interest is that, with no attempts at stabilization, its driving point admittance is characterized by a pole-zero pattern, as shown in FIG. 7, when the small signal equivalent of the circuit of FIG. 5 is used to represent a transistor with the following equivalent circuit values:

$r_b=68\Omega$
$R_{ie}=540\Omega$
$R_o=10\ M\Omega$
$g_m=0.144\Omega$
$C_{ie}=11.4\ pf.$
$C_{Ob}=0.8\ pf.$
$C_L=100\ pf.$
$R_g=300\Omega.$ Using the equivalent circuit indicated and the element values listed above results in a pole-zero plot of the form shown in FIG. 7. As shown, there are two clusters I and II of poles and zeros on the negative real axis, each consisting of two poles and a zero, so closely spaced that each cluster can be treated as a single pole. If a single pole is assumed in each case, the resulting pole-zero pattern is evidently that of a passive RLC network, and the resulting admittance is very similar to that of a lossy inductor with a parasitic capacitor. Over a very wide range of element values assumed for the transistor equivalent circuit employed in analyzing the gyrator of FIG. 6, it has been found that the relative positions of the poles and zeros is unchanged, and the resulting input admittance is stable for all values of $C_L$ greater than a few $p$F.

For a given value of simulated inductors, the complex zeros of the driving point admittance which give the "self-resonating frequency" of the "inductor" are strongly dependent on the value of $C_{Ob}$. The following table gives the value of this self-resonating frequency for various parameters of the circuit.

| $R_g$ | $C_L$, pf. | $C_{Ob}$, p.f. | $L=R_g^2C_L$, μh. | Self resonating frequency f0, mHz. |
|---|---|---|---|---|
| 300 | 100 | 0.8 | 9 | 44.8 |
| 300 | 100 | 0.3 | 9 | 63.8 |
| 300 | 100 | 3.0 | 9 | 24.9 |
| 1,000 | 100 | 0.3 | 100 | 24.4 |
| 1,000 | 100 | 0.8 | 100 | 15.9 |
| 300 | 10 | 3.0 | .9 | 67.5 |
| 100 | 10 | 0.3 | .9 | 350.0 |

From the frequencies listed in the above tabulation it is evident that inductor replacement by capacitor loaded gyrator circuits in accordance with the invention can be effected even at UHF frequencies.

Each of the voltage controlled current sources and biasing means of the gyrator of FIG. 6 conventionally employ collector-to-collector connected NPN–PNP transistor pairs. For proper biasing it is essential that the collector currents of the two NPN and PNP transistors in each pair be equal. Such equality is not readily achieved with fixed components and particularly difficult to achieve in an integrated circuit where the characteristics of the PNP and NPN transistors may differ widely. Despite these difficulties, however, it is extremely desirable to avoid any mismatch in the currents of these NPN–PNP pairs, owing to the fact that any significant imbalance usually results in a reduction in the signal handling capacity of the circuits by introducing distortion on large signals. A solution to this problem is provided in accordance with the invention by a biasing arrangement which requires a match among the PNP transistors and a match among the NPN transistors; no match is required, however, between transistors of different conductivity types. Moreover, with such biasing the signal part of the circuit is inherently stable and requires no compensation over very high bandwidths.

Figure 8:
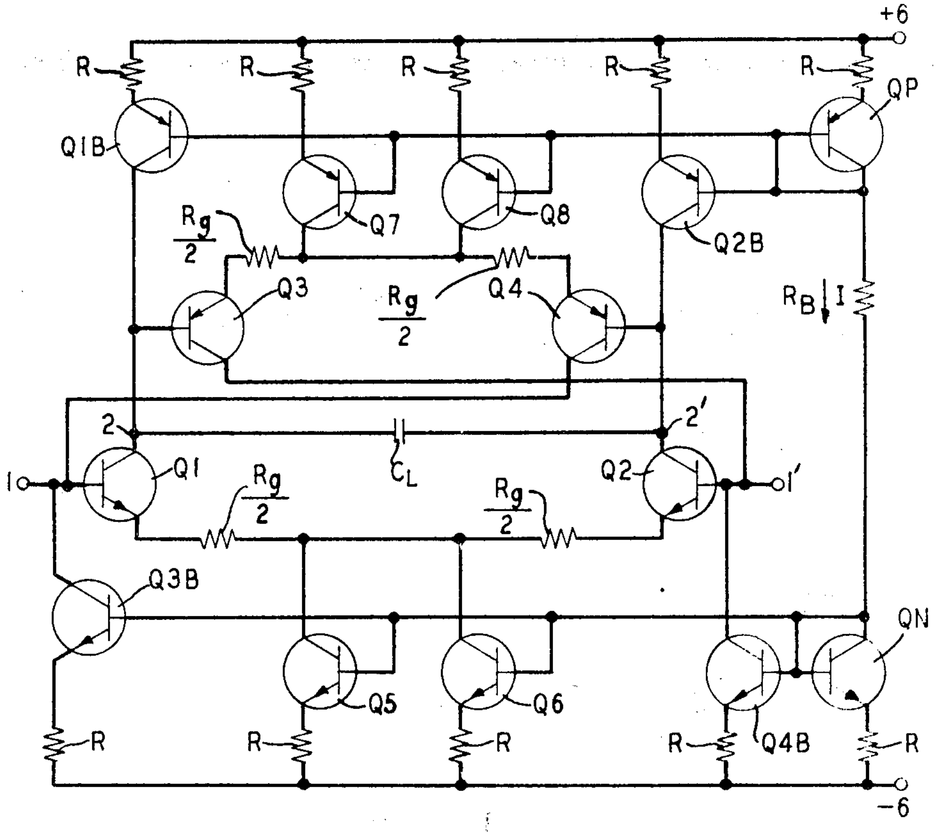
FIG. 8 is the circuit shown in FIG. 6 modified by a detailed showing of the biasing means.

A complete circuit of this type, including a detailed showing of the biasing arrangement, is illustrated by FIG. 8. The signal part of the circuit is essentially the same as the circuit of FIG. 6 in that the transistor pairs, Q1, Q2 and Q3, Q4 comprise the two differential voltage-to-current converters whose transconductances are equal to $i/R_g$. Each of the collectors of transistors Q1 through Q4 is connected to a suitable constant current biasing source comprising either a single transistor or a common polarity transistor pair from among the transistors Q1B–Q4B, Q5–Q8. When a signal voltage is applied between the bases of transistors Q1 and Q2, an equivalent differential current source is seen between the terminals 2 and 2′. Similarly, when a signal voltage is applied between the bases of transistors Q3 and Q4, an equivalent differential current source of the required polarity is seen between the terminals 1 and 1′. 1–1′ and 2–2′ thus form the two ports of a gyrator and a capacitor $C_L$ connected at the port 2–2′ appears like an inductor at the port 1–1′.

Although the circuit of FIG. 8 employs a substantial number of biasing transistors, it overcomes the very undesirable requirement which characterizes prior art gyrators of this general type for having a close match between the high quality PNP and NPN transistors. The compatibility of this circuit with integrated circuit fabrication techniques may thus be enhanced by employing two circuit chips, one containing all of the NPN transistors and the other containing all of the PNP transistors.

An important feature of the invention relating to the biasing means shown in FIG. 8, involves the use of transistors QN and QP as biasing control transistors. It is by means of these transistors that the biasing currents flowing in both the emitter and collector circuits of all of the converter transistors are maintained at a common level. This result may be explained as follows:

If the base currents of the biasing transistors in the circuit of FIG. 8 are negligible in comparison with the collector currents, the collector currents of transistors QP and QN are equal, and the current I through the resistor $R_B$ is determined by the values of R, $R_B$ and the $V_{BE}$ voltage drops of these transistors. Since the bases of transistors QN, Q3B, Q4B, Q5 and Q6 have the same DC potential and their emitters are all returned to a common negative supply voltage through equal resistors of magnitude R, each of these transistors has a collector current I. Similarly, the collector currents of transistors QP, Q1B, Q2B, Q7 and Q8 are all equal to I. Under the original assumptions that the base currents are negligible in comparison to the collector currents and the existence of a close match between transistors of the same kind, the collector currents of the transistors Q1 through Q4 are also equal to I. Thus, every transistor in the circuit has the same collector current I, which for a given value of R can be adjusted to any desired value by adjusting the single resistor $R_B$. The DC voltages of the nodes 1 and 1′ are nominally equal to zero and those of 2 and 2′ are at some positive voltage to assure adequate signal handling capability.

As indicated above, one of the important aspects of the circuit of FIG. 8 is its ability to realize a floating inductor at the port 1–1′ when a capacitor $C_L$ is connected at port 2–2′. Since the signal carrying portion is the same as the circuit of FIG. 6, the circuit is inherently stable and no external compensation is needed. A low frequency analysis of the circuit shows that the maximum possible Q for the circuit is $\beta/2$ where $\beta$ is the common emitter current gain of the transistor used. In accordance with the invention it has also been found, however, that substantially higher Q's are possible in circuits of the type shown in FIGS. 6 and 8 employing a respective Darlington pair transistor combination for each of the signal transistors Q1, Q2, Q3 and Q4.

For gyrator circuits in accordance with the invention, the gyration resistance can be changed by changing the value of $R_g$. It should be noted that for these circuits, whether or not Darlington pairs are used for the signal handling transistors, the maximum is a function of the $\beta$ of the transistors and the inductor value is a function of $R_g$.

In present monolithic silicon circuits the resistors are somewhat sensitive to temperature, exhibiting a temperature coefficient of as much as +3000 p.p.m./° C. For this reason, it is desirable under some conditions to incorporate these resistors and the capacitor C, which also determines the inductor value, in a tantalum circuit. This procedure allows for the simulation of a wide range of values of inductors with the same basic silicon block. For low to medium Q requirements, the Q of the simulated inductor, which may be high initially, can be degraded by shunt or series tantalum resistors and thus the Q variations, owing to behavior variations of the transistors with temperature, can be eliminated. Alternatively, the effects of ambient temperature variations may be eliminated by incorporating a temperature controlling circuit in the silicon chip.

One significant advantage of the employing gyrator capacitor combinations in accordance with the invention as replacements for the inductors of LC filters is the exceptionally low sensitivity of the filter to individual component variations. Moreover, filters constructed in this manner are bilateral in contrast to filters which employ operational amplifiers. This feature is of particular importance in communication systems wherein a relatively high proportion of all filters require bilateral characteristics.

It is to be understood that the embodiment described herein is merely illustrative of the principles of the invention. Various modifications thereto may be effected by persons skilled in the art without departing from the spirit and scope of the invention.

What I claim is:

1. A gyrator comprising, in combination, a first differential voltage-current converter including a first pair of elements, a second differential voltage-current converter including a second pair of elements, a first two-terminal port, a second two-terminal port, means connecting said first and second converters in parallel configuration with respect to said ports, said means including a first direct connection between a first one of said first pair of elements and a first one of said second pair of elements and a second direct connection between a second one of said first pair of elements and a second one of said second pair of elements, and third and fourth direct connections between said first and second elements of said first and second converters and between said second and first elements of said first and second converters, respectively.

2. Apparatus in accordance with claim 1 wherein each of said elements comprises a respective transistor.

3. Apparatus in accordance with claim 2 wherein a capacitive element is connected across said second port.

4. Apparatus in accordance with claim 3 including a plurality of biasing means, each of the collector electrodes of said transistors being connected directly to a corresponding one of said last named means, both of the emitter electrodes of said transistors of said first converter being connected to a first one of said biasing means and both of the emitter electrodes of said second converter being connected to a second one of said biasing means.

5. Apparatus in accordance with claim 4 further including means for ensuring that all of the biasing currents flowing through the emitter electrodes and through the collector electrodes of all of said transistors are substantially identical.

6. Apparatus in accordance with claim 5 wherein said biasing means comprises a first plurality of transistors each biasing the collector electrode of a respective one of the transistors in said voltage-current converters and a second plurality of transistors each biasing the emitter electrodes of said transistors in a respective one of said voltage-current converters and wherein said ensuring means comprises first and second transistors, said first transistor having its base and collector electrode connected directly to the base electrode of each of said transistors in said first plurality of transistors, said second transistor having its base and collector electrode connected directly to the base electrode of each of said transistors in said second plurality of transistors, and a resistive element connecting the collector electrodes of said first and second transistors.

7. Apparatus in accordance with claim 6 wherein one of the terminals of said first port is grounded.

8. A gyrator comprising, in combination, first and second ports, first and second differential voltage-current converters connected in parallel configuration with respect to said ports, each of said converters comprising a respective pair of transistors having each of the base electrodes thereof connected to a respective one of the terminals of a respective one of said ports, means connecting the base-emitter junctions of each of said pairs of transistors in series relation across a respective one of said ports, means connecting each of the collector electrodes of one of said paris of transistors to the respective base electrode of a corresponding one of said transistors in the other one of said pairs, and means connecting each of the collector electrodes of said transistors in said other one of said pairs to the respective base electrode of an opposite one of said transistors in said one of said pairs.

9. Apparatus in accordance with claim 8 wherein said transistors of said first converter are of one conductivity type and wherein said transistors of said second converter are of an opposite conductivity type.

10. Apparatus in accordance with claim 8 including a capacitive element connected across said second port.

11. Apparatus in accordance with claim 8 including a plurality of current supply means for biasing said transistors.

12. Apparatus in accordance with claim 11 wherein each of the collector electrodes of said transistors is biased by a respective one of said last named means and wherein first and second ones of said last named means are employed to bias both emitter electrodes in said first converter and both emitter electrodes in said second converter, respectively.

13. Apparatus in accordance with claim 11 including first resistive means connecting the emitter electrodes of said transistors of said first converter and second resistive means connecting the emitter electrodes of said transistors of said second converter 14. A gyrator circuit comprising, in combination, a first pair of terminals defining a first port and a second pair of terminals defining a second port, a pair of dual transistor differential voltage-current converters in parallel relation, the base electrode of each of said transistors being connected to a respective one of said terminals, each of the collector electrodes of the transistors in one of said converters being connected directly to the base electrode of a corresponding one of the transistors in the other of said converters and to a corresponding one of said terminals in said second pair of terminals, each of the collector electrodes of the transistors in the other of said converters being connected directly to the base electrode of an opposite one of said transistors in said one converter and to an opposite one of said terminals in said first pair of terminals, and a capacitive element connected across said second pair of terminals.

15. A gyrator circuit comprising, in combination, first and second transistors connected to form a first voltage-current converter, third and fourth transistors connected to form a second voltage-current converter, first and second ports, one side of said first port, the base electrode of said first transistor and the collector electrode of said fourth transistor sharing a first common terminal, the other side of said first port, the base electrode of said second transistor and the collector electrode of said third transistor sharing a second common terminal, one side of said second port, the collector electrode of said first transistor and the base electrode of said third transistor sharing a third common terminal, and the other side of said second port, the base electrode of said fourth transistor and the collector electrode of said second transistor sharing a fourth common terminal, and capacitive means connected across said second port.

16. Apparatus in accordance with claim 15 including first resistive means connecting the emitter electrodes of said first and second transistors and second resistive means connecting the emitter electrodes of said third and fourth transistors.